Patented Nov. 17, 1953

2,659,706

UNITED STATES PATENT OFFICE 2,659,706

COMPOUNDING PROCESS AND PRODUCT THEREOF FROM A MIXTURE OF A PHENOL-FORMALDEHYDE RESIN, BUTADIENE-ACRYLONITRILE COPOLYMER, AND A NONSOLVENT HYDROCARBON PLASTICIZER

Charles F. Fisk, Clifton, and Albert W. Meyer, Nutley, N. J., assignors to United States Rubber Company, New York, N. Y., a corporation of New Jersey No Drawing. Application October 7, 1950, Serial No. 189,069

17 Claims. (Cl. 260—33.6)

This invention relates to an improvement in compositions of matter comprising mutually compatible mixtures of thermosetting phenol-aldehyde resins and butadiene-acrylonitrile rubbery copolymers. More particularly, the invention relates to a new technique whereby there is obtained a raw stock which can be calendered or extruded with exceptional ease due to its very low elastic recovery and relatively high fluidity Much work has been done in recent years on thermoset products based upon mutually compatible mixtures of butadiene-acrylonitrile rubbery copolymers and soluble, fusible thermosetting phenol-aldehyde resins. It is customary to add a hardening agent, typified by hexamethylenetetramine, during the formulation of such mixtures to provide a source of formaldehyde for effecting thermosetting of the phenolic resin when the mixture is heat cured.

Mixtures of the foregoing type have proven to be extremely valuable for many purposes. Recently, great commercial interest has been aroused in such mixtures prepared and marketed in the form of an uncured flat adhesive strip made by calendering the mixture into a sheet and cutting the calendered sheet into strips. This uncured flat adhesive strip is widely used for the purpose of bonding brake linings to brake drums without rivets, to cement metal handles to automobile side windows, etc. In use, the uncured strip is simply placed between the two surfaces to be bonded, pressure is applied, and the assembly is heated whereupon the strip is cured thereby forming an exceedingly good bond.

However, it has been found that adhesive strips made from material which has been processed in the conventional manner are not satisfactory. Conventionally processed mixtures of butadiene-acrylonitrile elastomers and compatible thermosetting phenolic resins exhibit objectionably high modulus, are very strong and difficult to cut, and show excessively high shrinkage and deformation when they are tubed (i. e. extruded) or calendered.

Conventional practice in the manufacture of mixtures of such resins and rubbery copolymers involves mixing the rubbery copolymer and the phenolic resin on a mill at a high stock temperature so that the phenolic resin melts and dissolves. For example, U. S. patent to Groten et al., 2,459,739, at col. 10, describes the addition of the resin to the rubber on a cold mill as yielding an even mixture but no true compound. The patent goes on to state that steam is introduced into the mill rolls to heat them to 120° C. (248° F.) and the milling is continued whereupon the stock fuses together into a compatible mass. As a matter of fact, it is normally impossible to avoid fusing of such mixtures when any compound of commercial interest is mixed on a mill.

It is an experimental fact that such mixed fused compounds are intractable in further processing and they exhibit all of the undesirable properties outlined above. For these reasons, mixtures made by conventional processing procedures have attained almost no success in the art.

The present invention is based upon our discovery that a raw, i. e., uncured, stock comprising a compatible mixture of a butadiene-acrylonitrile rubbery copolymer and an unset thermosetting phenol aldehyde resin having none of the intractable properties mentioned above while still having essentially the same basic composition and the desirable properties of a correspondingly fused and mutually plasticized composition made by the conventional processing described above, can be obtained by forming an intimate mixture of the rubbery copolymer, the unset phenolic resin and a non-solvent hydrocarbon plasticizer while preventing the temperature of the mixture from exceeding 160° F. The stock obtained has extremely low elastic recovery, relatively high fluidity, is easy to cut, and is easy to calender or extrude. When the resulting intimately mixed stock is subjected to a shaping operation, especially calendering or extruding, in which the mixture is longitudinally attenuated into a shape desired for ultimate use, the shaped stock exhibits substantially no shrinkage and substantially no subsequent dimensional change.

In a typical embodiment of the present invention, we first commingle with 100 parts of the butadiene-acrylonitrile rubbery copolymer from 5 to 100 parts of a non-solvent hydrocarbon plasticizer as a first step and form an even mixture thereof. We then add the unset phenolic resin, typically in finely powdered form, and any other ingredients which are to be incorporated into the mixture. We then blend the mixture on a cold open roll mill or in a cold Banbury mixer or with other equipment in such a way that the stock temperature is prevented from exceeding 160° F. It is essential that the non-solvent plasticizer be used and it preferably is incorporated with the rubbery copolymer before the phenolic resin is incorporated or at the same time as the phenolic resin is incorporated. When the plasticizer is incorporated simultaneously with the phenolic resin, the plasticizer preferably is one which is liquid at room temperatures and preferably is first mixed with the phenolic resin which typically is in powdered form, by stirring to form a uniform mixture, whereupon this mixture is commingled with the rubbery copolymer while keeping the stock temperature below 160° F. at all times.

The raw mixed stock obtained by the observance of the precautions outlined above is "dead," is of low modulus, is easy to cut, and can be calendered or extruded with substantially no shrinkage or subsequent change in dimension of the calendered or extruded material.

As previously indicated, the use of a non-solvent hydrocarbon plasticizer is an essential feature of our invention. Such a plasticizer is one which is substantially immiscible or incompatible with the rubbery butadiene-acrylonitrile copolymer and with the phenolic resin. We prefer to employ those hydrocarbon plasticizers which are predominantly aliphatic rather than aromatic. We also prefer to employ materials which are substantially non-volatile at temperatures up to 160° F. We may use hydrocarbon liquids, hydrocarbon waxes, or hydrocarbon polymers of any molecular weight, or mixtures of any of these. We have obtained good results with lubricating oils; polybutenes, especially polyisobutylenes; Butyl rubber, i. e., the synthetic rubber known as GR—I which is a low temperature copolymer of a major proportion of isobutylene and a minor proportion of an aliphatic conjugated diolefin, e. g., butadiene or isoprene; natural rubber, namely that obtained from Hevea latex; butadiene-styrene rubbery copolymers, i. e., GR–S; polybutadiene; and paraffin oils.

A simple test can be used to determine whether a plasticizer is classified as the solvent type or the nonsolvent type for purposes of the present invention. In this test a butadiene-acrylonitrile rubber-phenolic resin formulation containing 10 parts of the plasticizer in question is first dissolved in a ketone or in a mixture of a ketone and a volatile hydrocarbon solvent. A film of this solution is laid down on glass and allowed to dry. If the plasticizer is of the solvent type, e. g., dioctyl phthalate, the film obtained will be perfectly clear. If the plasticizer is of the non-solvent type such as any of the hydrocarbon plasticizers mentioned above, the film obtained will be cloudy or opaque and undissolved plasticizer droplets will be visible under the microscope. This test can also be made by preparing separate solutions of the components, blending these solutions and then casting a film therefrom for examination.

In practicing our invention, we employ a phenolaldehyde resin which is soluble, fusible and thermosetting, i. e., capable of cross-linking with formaldehyde or a hardening agent supplying formaldehyde, such as hexamethylenetetramine or paraformaldehyde, under the conditions of curing. The phenolic resin is almost invariably of the type known in the art as a novolak, prepared by the condensation of phenol and formaldehyde in the presence of an acid catalyst, the ratio of phenol to formaldehyde being such that the resin is fusible and soluble in polar solvents. The resin may be a straight phenol-aldehyde resin or it may be modified with any suitable modifying agent acording to known practice.

Thus, the resin can be based upon common trifunctional phenols, e. g., ordinary phenol. The trifunctional phenols are those which are free from substitution in the three positions ortho and para to the phenolic hydroxyl group. The resin can be modified by employing such a trifunctional phenol in conjunction with another phenol which may be trifunctional, difunctional or monofunctional. For example, we can use a resin based upon ordinary phenol but modified or co-condensed with a lesser proportion of any of the following phenols, which may be either pure or mixed: the cresols, the xylenols, the trimethylphenols, monochlorophenols, dichlorophenols, diamylphenols, diisopropylphenols, p - tertiarybutylphenol, p-phenylphenol, resorcinol, and hydroquinone. We especially prefer to employ a resin based upon ordinary phenol and the phenol which is obtained from cashew nut shell oil by heating whereby it is converted to the long-chain unsaturated phenol, m-(7-tetradecenyl) phenol, commonly known as cardanol. When a mixture of ordinary phenol and cardanol is reacted with formaldehyde in a manner well known to the art, there is produced a thermosetting, soluble, fusible, cashew nut shell oil-modified resin which, upon being heated with a minor proportion of hexamethylenetetramine, is converted to the insoluble, infusible state. The amount of the cashew nut shell oil phenol employed for modifying the resin preferably ranges from 3 to 12 mol percent based on the two phenols.

Cashew nut shell-oil modified phenol-aldehyde resins which are extremely satisfactory for use in the present invention are available commercially. An example of such a resin is that known in the trade as Durez No. 12686. Another example is Durez 12687, which is a mixture of 92–94 parts of Durez 12686 and 6–8 parts of hexamethylenetetramine. Such resins are typically made by heating the phenols and the aldehyde, typically formaldehyde, in the presence of an acdic catalyst, e. g., sulfuric or hydrochloric acid, to an oil-soluble stage. During the final stage of the resin-forming reaction, the resin is advanced to the desired state at which it is still soluble and fusible but convertible to insoluble, infusible condition under the action of heat and a formaldehyde-yielding hardening agent, and volatile materials are removed therefrom, these objectives being accomplished by passing super-heated steam through the charge until the residual mixture has reached a suitable elevated temperature, e. g., 150° to 225° C.

The elastomer employed in the practice of our invention is a butadiene-acrylonitrile rubbery copolymer of known type having a combined acrylonitrile content ranging between 10 and 55 mol-percent. Examples are the commercially available materials known as Paracril AJ (formerly as Perbunan 18), Paracril B (formerly Perbunan 26), Paracril C (formerly Perbunan 35), Hycar OR–15 and Hycar OR–25. The rubbery copolymer used should be such that it is mutually compatible with the phenolic resin.

The resin should be soluble in the rubbery copolymer at least to the extent of 10% and preferably at least to the extent of 50%, on the weight of the copolymer. The rubbery copolymer should exhibit a similar solubility in the resin. One skilled in the art can readily determine whether a given resin and a given rubbery copolymer have the necessary degree of mutual solubility. The mutual solubility can be readily judged by observing the degree of transparency of the mixture before curing.

The relative proportions of the phenolic resin and the rubbery copolymer can vary from 20 to 70% by weight of the resin and correspondingly from 80 to 30% by weight of the rubbery copolymer, these proportions being based upon the sum of the resin and the rubbery copolymer. Preferably, proportions ranging from 40 to 60% of the resin and from 60 to 40% of the rubbery copolymer are used.

The mixture of resin and rubber should contain a suitable proportion of a hardening agent for the resin. Hexamethylenetetramine is by far the preferred material for this purpose since it is capable of giving off formaldehyde under the conditions of curing whereby the resin is advanced to the insoluble, infusible condition. We can also use formaldehyde, or any of the polymeric formaldehydes such as paraformaldehyde, in conjunction with ammonia or an ammonium salt such as ammonium carbonate as the hardening agent, since such procedures will lead to the formation of hexamethylenetetramine in situ and, in effect, amount to the addition of hexamethylenetetramine.

The mutual compatibility, or the solubility of the resin and the elastomer in one another, should be such that after the curing with the hexamethylenetetramine is completed, the condensed cross-linked resin still remains dissolved in the rubber to a large extent. Again this can be judged by the degree of transparency or translucency of the cured mixture. Thus the cured product can be visualized as a normally cross-linked phenolic resin which however is swollen by a high molecular weight, non-volatile solvent and plasticizer, namely the rubber.

The following examples will illustrate our invention in more detail. All parts are by weight.

*Example 1*

| | |
|---|---|
| Paracril C (rubbery copolymer of butadiene and acrylonitrile) | 100 |
| GR-I 50 (Butyl rubber) | 10 |
| No. 8 oil (essentially paraffinic) | 10 |
| Durez 12687 | 160 |

The Paracril C was milled on a laboratory mill with the rolls at 100° F. The non-solvent plasticizers, i. e., the GR-I and the No. 8 oil, were then incorporated with the Perbunan to form a smooth even mixture. With the rolls at 100° F., the powdered resin was then added and intimately incorporated. The final stock temperature was 125° F. The mixed stock was then passed through two calender rolls heated to 150° F. after which the calendered sheet showed a shrinkage of less than 1%, and it did not shrink further upon heating to 212° F.

*Example 2*

To show the advantage of the process of our invention over conventional processing, the following compound was mixed:

| | |
|---|---|
| Paracril C | 100 |
| Dioctyl phthalate | 20 |
| Durez 12687 | 160 |

Dioctyl phthalate as contrasted to the GR-I and No. 8 oil used in Example 1 is a solvent plasticizer compatible with both the elastomer and the resin. Although the temperature of the mill rolls was 100° F., the compound formed a mutually plasticized or dissolved mixture with a stock temperature of 170° F. regardless of the order of addition. When this raw stock was passed through a calender with rolls heated to 150° F., the calendered sheet shrank 62% in length with an increase in width and thickness. When the dioctyl phthalate was omitted the shrinkage was even greater.

When the calendered compounds of Examples 1 and 2 were cured in a mold, the cured products exhibited about the same strength and hardness properties.

We have further observed that if the raw stock made according to Example 1 is placed upon a mill and the temperature of the rolls is raised so that the stock temperature exceeds 160° F. a great change occurs. Thus the phenolic resin melts and the whole mix becomes fused and dissolved. This raw stock is then extremely intractable, shows excessively high shrinkage on calendering and cannot be distinguished from the compound of Example 2 mixed in the ordinary way as described above. This result further shows that a stock temperature of not over 160° F. is necessary to obtain the desired easy-processing, low-shrinkage, high dimensional stability raw stock of our invention, even when the non-solvent hydrocarbon plasticizer has been properly incorporated.

Raw stocks made in accordance with the principles of the present invention have met with outstanding success particularly when marketed as an uncured flat adhesive strip for attaching brake lining, metal handles, etc. Stocks so formulated have completely overcome the disadvantages of conventionally processed mixtures.

While the butadiene-acrylonitrile rubbery copolymer, non-solvent plasticizer and phenolic resin are the principal components of mixtures of our invention, we can of course add other materials such as fillers, pigments, dyestuffs, antioxidants for the rubbery copolymers, etc. While we can incorporate curatives or vulcanizing agents for the rubbery copolymer, this is unnecessary for many applications. We can add curatives for the resin, such as those shown in copending application of Charles F. Fisk, Serial No. 172,629, filed July 7, 1950, now Patent No. 2,605,248.

*Example 3*

| | |
|---|---|
| Hycar OR-15 (butadiene-acrylonitrile rubber) | 16 |
| GR-S | 4 |
| Durez 12687 | 20 |
| Diatomaceous earth | 20 |
| Zinc stearate (mold lubricant) | 0.3 |
| Anti-oxidant (for rubbers) | 0.3 |
| Oil-soluble black dye | 1.0 |

These ingredients were commingled by first mixing the two rubbery copolymers together and then adding the resin, diatomaceous earth and other minor components and continuing to mix until a uniform mixture was obtained. The temperature was kept from exceeding 125° F. The mixture processed with extreme ease. It was found exceedingly satisfactory for the manufacture of battery cases whereas the same compound in which 20 parts of Hycar OR-15 were used in place of the 16 parts of Hycar OR-15 and 4 parts GR-S was deemed unsuitable.

As will be obvious to those skilled in the art, the unset compositions of our invention are utilized in the conventional manner, i. e., when they are in the final position or shape, they are heated to a curing temperature, typically ranging from 300 to 360° F., for a time sufficient to advance the phenolic resin to insoluble, infusible form. During curing, the rubber and the resin appear to exert a curing action upon each other. The final cured product is insoluble and infusible and retains its shape permanently.

Having thus described our invention what we claim and desire to protect by Letters Patent is:

1. A method of making a composition of matter comprising a rubbery copolymer of butadiene and acrylonitrile and a phenol-formaldehyde resin compatible therewith which comprises forming an intimate mixture of a rubbery copolymer of butadiene and acrylonitrile, an unset thermosetting phenol-formaldehyde resin compatible therewith, and a non-solvent hydrocarbon plasticizer, preventing the stock temperature from exceeding 160° F. during said forming step, subjecting the resulting stock to a shaping operation in which the mixture is longitudinally attenuated into an uncured shape desired for ultimate use, and preventing the stock temperature from exceeding 160° F. during said shaping step, said ingredients being present in proportions of from 20 to 70% of said resin and correspondingly from 80 to 30% of said copolymer, said percentages being by weight based on the sum of said resin and said copolymer, and from 5 to 100 parts by weight of said plasticizer per 100 parts of said copolymer, the shaped stock exhibiting substantially no shrinkage or subsequent dimensional change.

2. A method of making a composition of matter comprising a rubbery copolymer of butadiene and acrylonitrile and a phenol-formaldehyde resin compatible therewith which comprises forming an intimate mixture of a rubbery copolymer of butadiene and acrylonitrile, an unset thermosetting phenol-formaldehyde resin compatible therewith, and a non-solvent hydrocarbon plasticizer, preventing the stock temperature from exceeding 160° F. during said forming step, incorporating the said plasticizer with the said copolymer not later than simultaneously with the incorporation of said resin therewith, subjecting the resulting stock to a shaping operation in which the mixture is longitudinally attenuated into an uncured shape desired for ultimate use, and preventing the stock temperature from exceeding 160° F. during said shaping step, said ingredients being present in proportions of from 20 to 70% of said resin and correspondingly from 80 to 30% of said copolymer, said percentages being by weight based on the sum of said resin and said copolymer, and from 5 to 100 parts by weight of said plasticizer per 100 parts of said copolymer, the shaped stock exhibiting substantially no shrinkage or subsequent dimensional change.

3. A method of making a composition of matter comprising a rubbery copolymer of butadiene and acrylonitrile and a phenol-formaldehyde resin compatible therewith which comprises intimately incorporating a non-solvent hydrocarbon plasticizer with a rubbery copolymer of butadiene and acrylonitrile and forming a uniform mixture thereof, commingling with said mixture an unset thermosetting phenol-formaldehyde resin compatible with said copolymer and intimately blending the said mixture and resin while preventing the stock temperature from exceeding 160° F., subjecting the resulting stock to a shaping operation in which the mixture is longitudinally attenuated into an uncured shape desired for ultimate use, and preventing the stock temperature from exceeding 160° F. during said shaping step, said ingredients being present in proportions of from 20 to 70% of said resin and correspondingly from 80 to 30% of said copolymer, said percentages being by weight based on the sum of said resin and said copolymer, and from 5 to 100 parts by weight of said plasticizer per 100 parts of said copolymer, the shaped stock exhibiting substantially no shrinkage or subsequent dimensional change.

4. A method of making a composition of matter comprising a rubbery copolymer of butadiene and acrylonitrile and a phenol-formaldehyde resin compatible therewith which comprises mixing a powdered unset thermosetting phenol-formaldehyde resin with a liquid hydrocarbon plasticizer which is a non-solvent for said resin and for the rubbery copolymer described hereinafter to form a uniform, intimate mixture, mixing the resulting mixture with a rubbery copolymer of butadiene and acrylonitrile to form a uniform, intimate mixture while preventing the stock temperature from exceeding 160° F., subjecting the resulting mixture to a shaping operation in which the mixture is longitudinally attenuated into an uncured shape desired for ultimate use, and preventing the stock temperature from exceeding 160° F. during said shaping step, said ingredients being present in proportions of from 20 to 70% of said resin and correspondingly from 80 to 30% of said copolymer, said percentages being by weight based on the sum of said resin and said copolymer, and from 5 to 100 parts by weight of said plasticizer per 100 parts of said copolymer, the shaped stock exhibiting substantially no shrinkage or subsequent dimensional change.

5. The method of claim 1 wherein said plasticizer comprises a low temperature rubbery copolymer of isobutylene and an aliphatic conjugated diolefin.

6. The method of claim 1 wherein said plasticizer comprises a paraffin oil.

7. The method of claim 1 wherein said plasticizer comprises a rubbery copolymer of butadiene and styrene.

8. The method of claim 1 wherein said plasticizer comprises a material consisting of a polybutene.

9. The method of claim 1 wherein said plasticizer comprises a material consisting of a polybutadiene.

10. A method of making a composition of matter comprising a rubbery copolymer of butadiene and acrylonitrile and a phenol-formaldehyde resin compatible therewith which comprises forming an intimate mixture of a rubbery copolymer of butadiene and acrylonitrile, an unset thermosetting phenol-formaldehyde resin compatible therewith, and a non-solvent hydrocarbon plasticizer while preventing the temperature of the stock from exceeding 160° F., said ingredients being present in proportions of from 20 to 70% of said resin and correspondingly from 80 to 30% of said copolymer, said percentages being by weight based on the sum of said resin and said copolymer, and from 5 to 100 parts by weight of said plasticizer per 100 parts of said copolymer, the resulting raw mixed stock being "dead," of low modulus, easy to cut and upon being shaped by longitudinal attenuation giving a shaped uncured stock exhibiting substantially no shrinkage or subsequent dimensional change.

11. A new composition of matter comprising an unset intimate mixture of a rubbery copolymer of butadiene and acrylonitrile, a thermosetting phenol-formaldehyde resin compatible therewith, and a non-solvent hydrocarbon plasticizer in proportions of from 20 to 70% of said resin and correspondingly from 80 to 30% of said copolymer, said percentages being by weight based on the sum of said resin and said copolymer, and from 5 to 100 parts by weight of said plasticizer per 100 parts of said copolymer, said ingredients having been commingled at a stock temperature not exceeding 160° F., said mixture being characterized by its "deadness," low modulus, and ease of cutting, and by the fact that upon being calendered the calendered material exhibits substantially no shrinkage or subsequent dimensional change.

12. A composition of matter as set forth in claim 11 wherein said plasticizer comprises a low temperature rubbery copolymer of isobutylene and an aliphatic conjugated diolefin.

13. A composition of matter as set forth in claim 11 wherein said plasticizer comprises a paraffin oil.

14. A composition of matter as set forth in claim 11 wherein said plasticizer comprises a rubbery copolymer of butadiene and styrene.

15. A composition of matter as set forth in claim 11 wherein said plasticizer comprises a material consisting of a polybutene.

16. A composition of matter as set forth in claim 11 wherein said plasticizer comprises a material consisting of a polybutadiene.

17. An uncured calendered sheet of an intimate mixture of a rubbery copolymer of butadiene and acrylonitrile, a phenol-formaldehyde resin compatible therewith, and a non-solvent hydrocarbon plasticizer in proportions of from 40 to 60% of said resin and correspondingly from 60 to 40% of said copolymer, said percentages being by weight based on the sum of said resin and said copolymer, and from 5 to 100 parts by weight of said plasticizer per 100 parts of said copolymer, said ingredients having been commingled at a stock temperature not exceeding 160° F., and the resulting mixture having been calendered into said sheet at a stock temperature not exceeding 160° F., said mixture being characterized by its "deadness," low modulus, and ease of cutting, and by the fact that upon being calendered the material exhibits substantially no shrinkage or subsequent dimensional change.

CHARLES F. FISK.
ALBERT W. MEYER.

References Cited in the file of this patent

UNITED STATES PATENTS

| Number | Name | Date |
|---|---|---|
| 2,473,319 | Winkelmann | June 14, 1949 |
| 2,540,592 | Newberg | Feb. 6, 1951 |
| 2,545,516 | Gessler | Mar. 20, 1951 |

OTHER REFERENCES

Newberg et al., Rubber Age, Feb. 1948, pages 533–539.

Gessler et al., Ind. and Eng. Chem., Aug. 1949, pages 1751–1757.